United States Patent [19]

Lisowsky

[11] Patent Number: 5,044,784
[45] Date of Patent: Sep. 3, 1991.

[54] BEARING ISOLATOR

[75] Inventor: Bohdan Lisowsky, Troy, Mich.

[73] Assignee: Eaton Corporation, Cleveland, Ohio

[21] Appl. No.: 560,917

[22] Filed: Jul. 31, 1990

[51] Int. Cl.⁵ .............................................. F16C 27/00
[52] U.S. Cl. .................................... 384/536; 384/582
[58] Field of Search ................ 384/535, 536, 581, 582

[56] References Cited

U.S. PATENT DOCUMENTS

| | | |
|---|---|---|
| 3,050,352 | 8/1962 | Moxley . |
| 3,385,543 | 5/1968 | Jäkel et al. |
| 3,447,846 | 6/1969 | Marsh . |
| 3,704,922 | 12/1972 | Kleinschmidt et al. |
| 3,743,059 | 7/1973 | Morse et al. ................... 384/536 X |
| 3,743,365 | 7/1973 | Kato . |
| 3,885,840 | 5/1975 | Neder . |
| 4,229,055 | 10/1980 | Olschewski et al. |

FOREIGN PATENT DOCUMENTS 1072020 12/1959 Fed. Rep. of Germany ...... 384/535

Primary Examiner—Thomas R. Hannon
Attorney, Agent, or Firm—R. A. Johnston

[57] ABSTRACT

A bearing isolator having an outer metal mounting ring adapted for attachment to a mounting structure, an inner metal mounting ring, adapted for registration on the outer race of a bearing for journalling a shaft, and an energy-absorbing ring of composite material radially intermediate the metal rings. A first plurality of relatively short spokes extends between the composite ring and the outer metal ring; and, a second plurality of relatively short spokes extends between the composite ring and the inner metal ring and is circumferentially staggered from the first plurality of spokes. Resilient wave-like radial deflection of the composite ring occurs between the spokes to absorb vibration and acoustic energy.

10 Claims, 2 Drawing Sheets

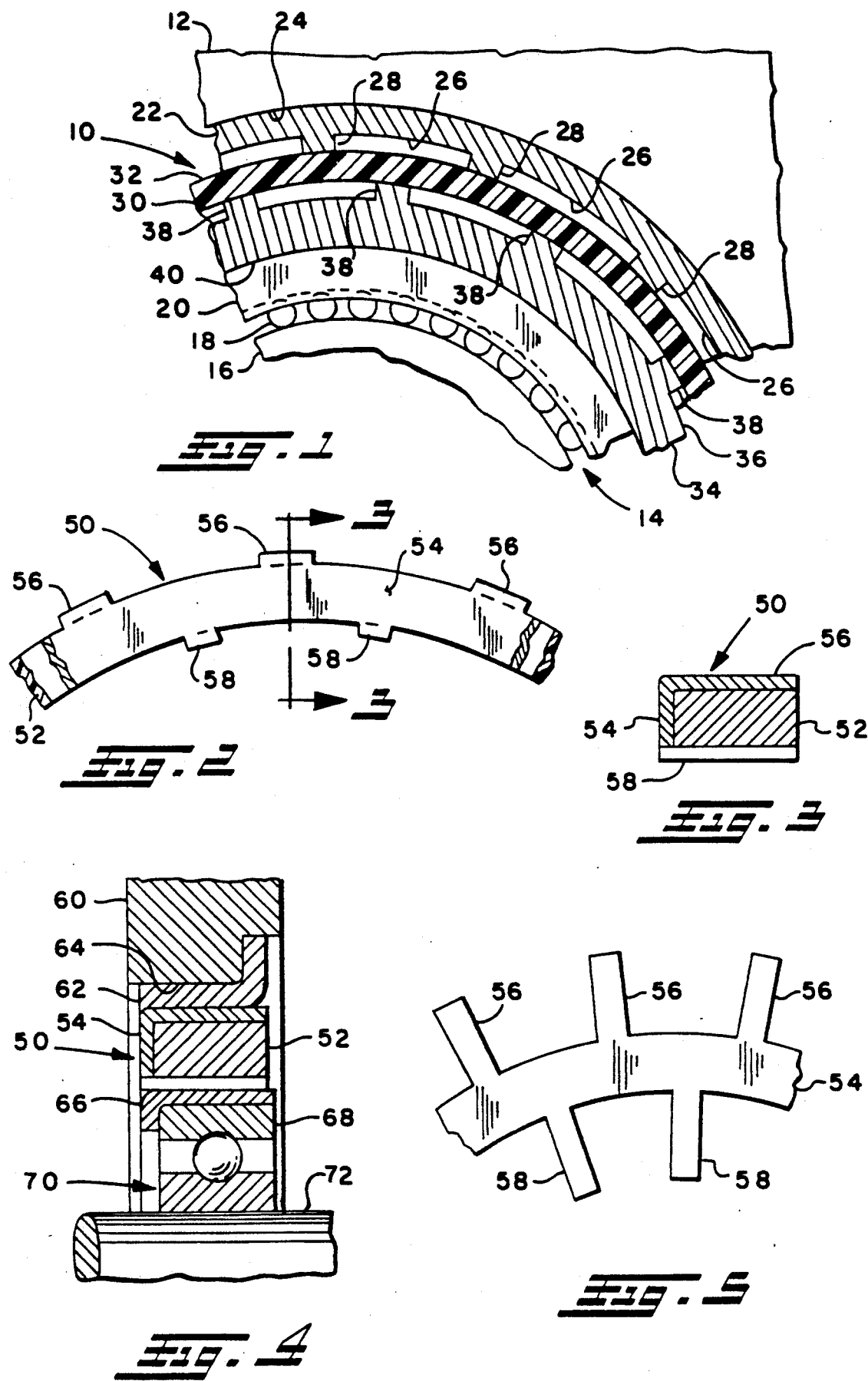

1

BEARING ISOLATOR

BACKGROUND OF THE INVENTION

The present invention relates to the installation of bearings in housing or casings for power transmission shafts and particularly to ball and roller bearings employed in transmissions for the vehicular drive trains. In heavy duty on-and-off highway vehicles where substantial torque is transmitted through power transmissions as for example, gearboxes, problems have been encountered in providing quiet operation; and, it has been desired to reduce the gear noise transmitted from gear shafts through the journals to the housing or gear casing.

In typical heavy duty power transmissions employed for vehicular use, the bearings employed for journalling the various shafts in the transmission have the outer race of the bearing registered directly against the gear casing which is commonly formed of metal such as cast iron, steel or aluminum. Thus, vibrations brought about by the high torque meshing of gear teeth are transmitted from the shafts and the bearing races to the casing or housing providing, in some cases, resonance of the housing and an amplification of the noise.

In order to provide for quieter operation of heavy duty power transmissions employing gears, it has thus been desired to find a way or means of isolating the bearing journals from the gear casing or housing to provide dampening of the gear noise and prevent transmission of the gear noise or vibration to the housing.

SUMMARY OF THE INVENTION

The present invention provides a unique and novel isolator for the mounting of a bearing for journalling a power transmission shaft to a base structure or housing. The isolator of the present invention provides a controlled amount of radial resiliency to the mounting of the outer race of the bearing for typical roller and ball bearing installations. The isolator of the present invention prevents the outer race of the shaft bearing from directly contacting the mounting structure or housing, and thus does not provide a direct path for conductance of sound and vibration from the shaft through the bearing to the mounting structure.

The isolator of the present invention employs an annular, energy-absorbing non-metallic member formed of a suitable composite material, which is supported between an inner and outer annular metallic mounting rings by the energy-absorbing ring, is supported between a first plurality of relatively short radially extending spokes spaced about the inner periphery of the energy-absorbing member, and a second plurality of relatively short radially extending spokes extending between the outer periphery of the energy-absorbing member and the outer ring. The relatively short radial spokes on the inner and outer periphery of the energy-absorbing ring are circumferentially staggered to provide for a alternating beam mounting of the energy-absorbing member such that radial deflection thereof is generally of a wave shaped nature.

In one embodiment, the first and second plurality of relatively circumferentially spaced radial spokes is provided by a recess formed in the inner and outer rings. In a second embodiment, the first and second plurality of relatively short radially extending spokes is provided by tabs extending axially from a metallic ring disposed axially adjacent to the edge of the energy-absorbing ring.

The present invention thus provides a unique and novel resilient energy-absorbing composite isolator ring supported at its radially inner and outer surfaces by a first and second plurality of circumferentially spaced and staggered relatively short radial spokes. The isolator of the present invention thus enables the controlled radial movement of the energy-absorbing ring in response to shaft induced vibrations to thereby provide dampening of sound and vibration from the shaft to the housing on which the bearing journalling the shaft is mounted.

BRIEF DESCRIPTION OF THE DRAWINGS

FIG. 1 is a portion of a section view of the bearing isolator of the present invention;

FIG. 2 is a portion of another embodiment of the bearing isolator of the present invention;

FIG. 3 is a section view taken along section indicating lines 3—3 of FIG. 2;

FIG. 4 is a cross sectional view of the bearing isolator of FIG. 2 installed in a mounting structure for mounting a bearing journalling a shaft;

FIG. 5 is a plan view of the pattern for forming the spoke member of the embodiment of FIG. 2;

DETAILED DESCRIPTION

Figure 6:
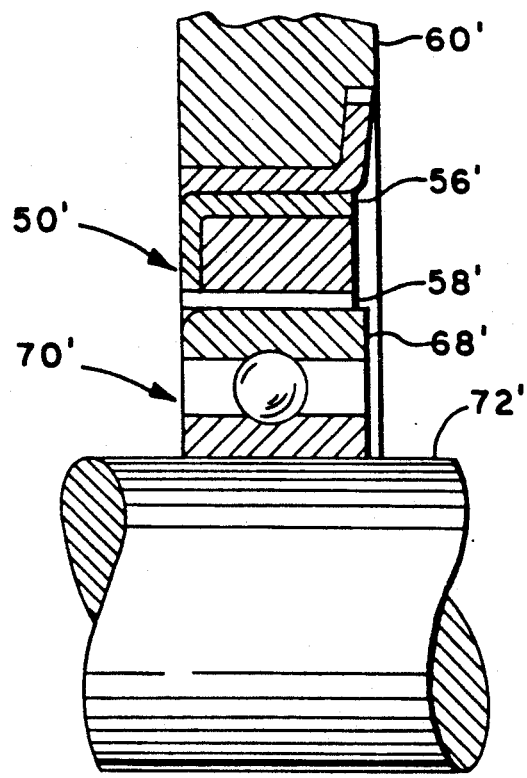
FIG. 6 is a view similar to FIG. 4 showing another embodiment of the invention; and, FIG. 7 is a view similar to FIG. 4 showing still another embodiment of the invention.

Referring to FIG. 1, a bearing isolator in accordance with the present invention is indicated generally at 10 installed in a mounting structure or housing 12 for mounting a bearing indicated generally at 14 typically of the ball or roller type. Bearing 14 has an inner race 16 adapted for receiving a shaft to be journalled therein (not shown in FIG. 1), a plurality of rollers 18 and an outer race 20.

The bearing isolator assembly 10 has an outer rigid mounting ring 22, formed preferably of metallic material, having the outer periphery thereof registered in an aperture 24 provided in the mounting structure 12. The inner periphery of the outer ring 22 has a plurality of circumferentially spaced recesses or voids 26 formed therein, which are circumferentially spaced to provide therebetween a plurality of relatively short radially inwardly extending spokes or lugs 28.

An energy-absorbing ring formed of non-metallic material 30 is provided and which has its outer periphery 32 registered against the radially inner ends of the lugs 28. In the presently preferred practice, the energy-absorbing ring 30 is formed of a composite material as will herein after be explained in detail.

An inner rigid bearing support ring 34 is provided and is formed preferably of metallic material with the outer periphery 36 thereof provided with a plurality of voids or recesses disposed of circumferentially spaced arrangements so as to define therebetween a plurality of radially outwardly extending lugs or spokes 38 which have the radially outer end thereof registered against the inner periphery of the energy-absorbing ring 30. The lugs 38 are staggered circumferentially from the lugs 28 provided in the outer ring 22.

The inner periphery 40 of the inner rigid bearing support ring 34 has registered thereagainst in preferably a line-to-line fit the outer periphery of outer bearing race 20, thereby providing a suitable mounting arrangement for the bearing 14.

The lugs 28, 38 are formed sufficiently short to enable only limited deflections of energy-absorbing ring 30 in the radial direction between any two lugs on the same side thereof thereby limiting radial movement of the bearing 14.

In the presently preferred practice the energy-absorbing ring 30 is formed of a composite of resinous plastic material and solid particulate matter interspersed therein. In particular, the energy-absorbing ring may be formed of a polymer matrix including fibrous glass material and epoxy resinous material. In the present practice invention, it has been found particularly satisfactory to form the energy-absorbing ring 30 of resinous material selected from the group cons of a) polimide, b) polyetheretherketone, c) aromatic polyimide, or (d) epoxy and to have a minor fractional fill by materials selected from the group consisting of e) graphite, f) glass particles or (g) glass fibers. The energy-absorbing ring may be also formed of mixtures of the foregoing or other suitable energy-absorbing non-metallic materials. The energy absorbing ring 30 may also be formed of composite resinous plastic material having solid short fibers interspersed therein, or solid continuous fibers predominantly oriented in the circumferential direction, or a combination of solid continuous fibers oriented in the circumferential direction and solid particular matter interspersed therein.

The arrangement of the lugs 28 on outer ring 22 and the lugs 38 on the inner ring 34 in circumferentially staggered positions thus provides sinusoidal or wavelike deflections of the energy-absorbing ring 30 in response to radial movement of the outer bearing race 20 from vibration or loads on the shaft journalled in the bearing 14.

Referring to FIG. 2, another embodiment on the bearing isolator is indicated generally at 50 and has an energy-absorbing 52 formed of similar materials as the ring 30 of the embodiment of FIG. 1.

Referring to FIGS. 2, 3, and 5, the bearing isolator 50 includes a metallic member 54 disposed axially adjacent to the energy-absorbing ring 52 and the ring 54 has a plurality of circumferentially spaced tabs or lugs 56 extending from the outer periphery thereof and folded to extend in an axial direction. Similarly, a plurality of circumferentially extending tabs or lugs 58 are provided on the inner periphery of the metallic member 54 which lugs 58 are folded to extend axially in the same direction as the lugs 56. Thus, the lugs 56, 58 extend axially over the inner and outer periphery respectively of the energy-absorbing member 52, see FIG. 3. The flat pattern form for the metallic member 54 of the FIG. 2 embodiment is shown in FIG. 5.

Referring to FIG. 4, the bearing isolator 50 is shown as installed in mounting structure 60 which may typically comprise a transmission housing. The bearing isolator 50 has the outer lugs or spacers 56 of the metallic member 54 registered in the inner periphery on the outer mounting ring 62 preferably formed of metallic material and which is received in an aperture 64 provided in the mounting structure 60. The spacers or lugs 58 are registered against an inner mounting ring 66 preferably formed of metallic material and which contacts the outer periphery of an outer bearing race 68 of a typical ball bearing assembly indicated generally at 70 and which has journalled therein a power transmission shaft 72.

The isolator components can be grouped into useful subassemblies to enhance handling and insertion into housings. Typical subassemblies would comprise the items 62, 54, 52 and 66 and items 62, 54, 52 66 and 70 as shown in FIG. 4.

Referring to FIG. 6, another embodiment of the invention is illustrated wherein the bearing isolator 50 is shown in mounting structure 60' and has the spacers 58' directly contacting the outer periphery of an outer bearing race 68' of a bearing 70', thereby eliminating the inner mounting member 66 of the embodiment of FIG. 4. Bearing 70' has a shaft 72' journalled therein.

Figure 7:
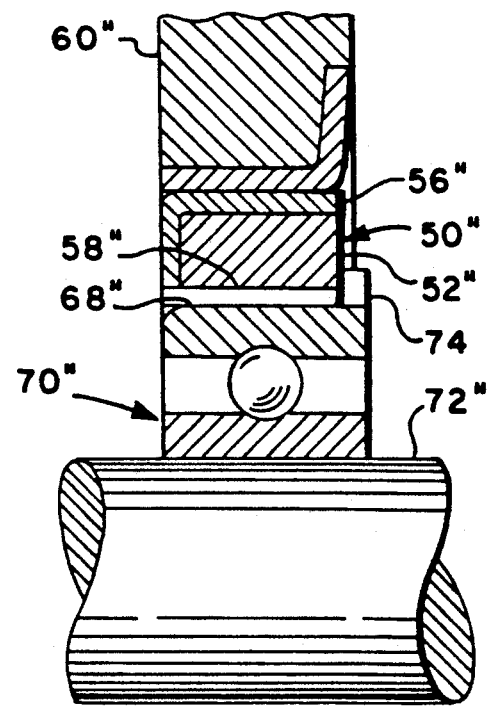

Referring to FIG. 7 still another embodiment of the invention is shown wherein the bearing isolator 50" is shown in mounting structure 60" and has the axial edge of the energy-absorbing ring 52" contacting an axial surface of a radially outwardly extending flange 74 provided on the outer periphery of the outer race 68" of a bearing 70". Bearing 70" has a shaft 72" journalled therein.

The present invention thus provides a unique and novel resilient bearing isolator for dampening sound and vibration transmitted to the bearing from a shaft journalled therein.

The present invention enables the bearing to be conveniently mounted in a housing or mounting structure with the isolator received over the outer periphery of the outer bearing race and in firm registration or contact therewith. Vibrations or acoustic energy is absorbed by limited radial deflection imparted to a composite energy-absorbing ring to prevent transmittal of sound to the mounting structure. The energy-absorbing ring of the present invention is formed of a suitable polymer matrix employing resinous material filled reinforced with particulate and/or fiberous solid materials to provide the necessary bulk stiffness yet retain the resiliency of the energy-absorbing properties of the resinous material.

Although the invention has been described above with respect to the presently preferred practice and the illustrated embodiments, it will be understood that the invention is capable of modification and variation, and is limited only by the following claims.

What is claimed is:

1. An isolator for use with a bearing for journalling a shaft on a mounting structure comprising: (a) an inner ring and an outer ring disposed concentrically and formed of rigid material, said inner ring adapted to have the outer race of said bearing secured thereto said outer ring adapted for attachment to said mounting structure; (b) an energy-absorbing ring formed of material concentrically disposed radially intermediate said inner and outer rings, said energy-absorbing ring formed of non-metallic material; and, (c) a ring member axially adjacent said energy-absorbing ring and having integrally therewith means defining a first plurality of circumferentially spaced spokes extending between said outer ring and said energy-absorbing ring and means defining a second plurality of circumferentially spaced spokes extending between said energy-absorbing ring and said inner ring, said first and second plurality of spokes circumferentially staggered with respect to each other.

2. The isolator defined in claim 1, wherein said energy-absorbing ring is formed of a composite of resinous plastic material and solid particulate matter interspersed therein.

3. The isolator defined in claim 1, wherein said first and second plurality of spokes are formed integrally in a metallic ring disposed axially adjacent said energy-absorbing ring.

4. The isolator defined in claim 1, wherein said energy-absorbing ring is formed of a polymer matrix including fibrous glass in epoxy resinous material.

5. The isolator defined in claim 1, wherein said energy-absorbing ring is formed of resinous material selected from the group consisting of (a) polyimids, (b) polyetheretherketone, (c) aromatic polyimids or (d) epoxy having a minor fractional fill by volume of material selected from the group consisting of (e) graphite, (f) glass particles, or (g) glass fibers and mixtures thereof.

6. The isolator defined in claim 1, wherein the said energy-absorbing ring is formed of a composite of resinous plastic material and solid short fibers interspersed therein.

7. The isolator defined in claim 1, wherein the said energy-absorbing ring is formed of a composite resinous plastic material and circumferential direction.

8. The isolator defined in claim 1, wherein the said energy-absorbing ring is formed of a composite resinous plastic material and a combination of solid continuous fibers oriented in the circumferential direction and solid particular matter interspersed therein.

9. An isolator for use with a bearing for journalling a shaft on a mounting structure comprising:
(a) an inner ring formed of rigid material and adapted to interfit on the outer race of a bearing to be journalled;
(b) an energy-absorbing ring formed of non-metallic material and having the inner periphery thereof fitted about the outer periphery of said inner ring;
(c) an outer ring formed of rigid material and adapted for attachment to said mounting structure and having the inner periphery thereof fitted about the outer periphery of said energy-absorbing ring;
(d) said energy-absorbing ring and said inner ring having a first plurality of circumferentially spaced voids for permitting radially inward deflection of said energy-absorbing ring thereinto and said energy-absorbing and said outer ring having a second plurality of circumferentially spaced voids for permitting radially outward deflection of said energy-absorbing ring thereinto staggered with respect to said first plurality of voids; and,
(e) a member disposed axially adjacent said energy-absorbing ring and having portions thereof forming said first plurality of voids.

10. An isolator for use with a bearing for journalling a shaft on a mounting structure comprising:
(a) an inner ring formed of rigid material and adapted to interfit on the outer race of a bearing to be journalled;
(b) an energy-absorbing ring formed of non-metallic material and having the inner periphery thereof fitted about the outer periphery of said inner ring;
(c) an outer ring formed of rigid material and adapted for attachment to said mounting structure and having the inner periphery thereof fitted about the outer periphery of said energy-absorbing ring;
(d) said energy-absorbing ring and said inner ring having a first plurality of circumferentially spaced voids for permitting radially inward deflection of said energy-absorbing ring thereinto and said energy-absorbing ring and said outer ring having a second plurality of circumferentially spaced voids for permitting radially outward deflection of said energy-absorbing ring thereinto staggered with respect to said first plurality of voids; and,
(e) a member disposed axially adjacent said energy-absorbing ring and having portions thereof forming said second plurality of voids.

* * * * *